United States Patent
Nakajima et al.

(10) Patent No.: US 8,704,400 B2
(45) Date of Patent: Apr. 22, 2014

(54) POWER CONVERTER FOR VEHICLE

(75) Inventors: Kenji Nakajima, Chiyoda-ku (JP); Kenichi Akita, Chiyoda-ku (JP); Masato Mori, Chiyoda-ku (JP); Mitsunori Tabata, Chiyoda-ku (JP); Katsuya Tsujimoto, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 881 days.

(21) Appl. No.: 12/610,608

(22) Filed: Nov. 2, 2009

(65) Prior Publication Data
US 2010/0289329 A1 Nov. 18, 2010

(30) Foreign Application Priority Data
May 14, 2009 (JP) .................... 2009-117680

(51) Int. Cl.
*B60L 1/00* (2006.01)
*H02M 7/217* (2006.01)

(52) U.S. Cl.
USPC .......................... 307/9.1; 363/127

(58) Field of Classification Search
USPC .......................... 307/9.1; 363/127
See application file for complete search history.

(56) References Cited

U.S. PATENT DOCUMENTS 5,920,475 A * 7/1999 Boylan et al. ................. 363/127
7,391,180 B2 * 6/2008 Armiroli et al. .............. 318/801

FOREIGN PATENT DOCUMENTS

JP 2008-228450 A 9/2008

* cited by examiner

*Primary Examiner* — Stephen W Jackson
*Assistant Examiner* — Dru Parries
(74) *Attorney, Agent, or Firm* — Sughrue Mion, PLLC

(57) ABSTRACT

A vehicle power converter including a plurality of switching elements having diodes connected thereto in parallel and constituting a multi-phase bridge circuit and a controller for conducting the switching element corresponding to each diode in synchronization with a conduction state of the diode concerned to perform synchronous rectification and is connected between a power generator-motor driven from the external to generate multi-phase AC power and DC equipment, further includes a load state detecting unit for detecting a load state of the power generator-motor when the multi-phase AC power occurs, wherein a shift from diode rectification to synchronous rectification or a shift from the synchronous rectification to the diode rectification is carried out in accordance with an output of the load state detecting unit.

3 Claims, 18 Drawing Sheets

POWER CONVERTER FOR VEHICLE

BACKGROUND OF THE INVENTION

1. Field of the Invention

The present invention relates to a vehicle power converter that is connected between an AC generator-motor and a DC power supply.

2. Description of the Related Art

A vehicle power converter for performing power conversion between DC power and AC power is used for a vehicle generator-motor which is mounted in a vehicle and driven to start up an engine and generates electric power after the engine is driven.

In general, such a vehicle power converter is connected between a power generator-motor and a battery, and it comprises a plurality of switching elements and diodes elements connected to the respective switching elements in parallel (for example, parasitic diodes appended to the switching elements). When the power generator-motor operates as an electric motor, DC power from the battery is converted to AC power by controlling ON/OFF of the switching elements. On the other hand, when the power generator-motor operates as a power generator, AC power generated by the power generator-motor is rectified by the diodes to be converted to DC power.

However, synchronous rectification based on switching elements has been recently used in place of diode rectification because it has higher efficiency and heat generation of elements is less. According to the synchronous rectification, in synchronization with a conduction state of respective diodes, the switching elements corresponding to the diodes concerned are conducted to each other. For example, a vehicle power converter disclosed in JP-A-2008-228450 performs a synchronous rectification operation of controlling ON/OFF of switching elements in synchronization with the timing at which the diodes are energized.

Normally, this type of control system controls the power generator-motor so that when power generation current generated by the power generator-motor is small, the diode rectification is carried out by the diodes connected to the switching elements in parallel, and then when the power generation current thus generated increases, the diode rectification is shifted to the synchronous rectification.

JP-A-2008-228450 describes means for implementing the synchronous rectification in detail, but has no disclosure about a shift condition for the shift from the diode rectification to the synchronous rectification and the shift from the synchronous rectification to the diode rectification. Therefore, the method of JP-A-2008-228450 has the following problem. That is, when the rectification style is shifted from the diode rectification to the synchronous rectification under a low-rotation and low-load state, the induced voltage is lowered due to execution of the synchronous rectification, and thus on-timing and off-timing of diodes for comparing the induced voltage and a voltage Vp at a positive side terminal P for generation cannot be accurately calculated, and thus the synchronous rectification may fail.

As the voltage value of a power generation voltage is higher, a larger power generation current (load current) is required to shift the rectification style from the diode rectification to the synchronous rectification. Therefore, there is a problem that an operation area in which the synchronous rectification can be performed is narrow when the power generation voltage is high.

SUMMARY OF THE INVENTION

The present invention has been implemented in view of the foregoing problems, and has an object to provide a vehicle power converter for performing conversion between DC power and AC power in which a shift condition for the shift from diode rectification to synchronous rectification and the shift from the synchronous rectification to the diode rectification is set, and the shift condition is made variable in accordance with a power generation voltage, whereby the synchronous rectification can be performed even under a low load state and an operation area for highly efficient synchronous rectification can be enlarged.

According to the present invention, a vehicle power converter that includes a plurality of switching elements having diodes connected thereto in parallel and constituting a multi-phase bridge circuit and a controller for conducting the switching element corresponding to each diode in synchronization with a conduction state of the diode concerned to perform synchronous rectification and is connected between a power generator-motor driven from the external to generate multi-phase AC power and DC equipment further includes a load state detecting unit for detecting a load state of the power generator-motor when the multi-phase AC power occurs, and a rectification style is shifted from diode rectification to synchronous rectification or from the synchronous rectification to the diode rectification in accordance with an output of the load state detecting unit.

According to the controller for the power generator-motor of the present invention, a load condition is used as a condition for the shift from the diode rectification to the synchronous rectification or/and from the synchronous rectification to the diode rectification, whereby failure of the synchronous rectification at the shift time can be prevented. Furthermore, a power generation voltage is added to the shift condition, whereby the synchronous rectification can be performed in abroad range even when the power generation voltage varies. Accordingly, a highly efficient vehicle power converter can be provided.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

A vehicle power converter according to a first embodiment of the present invention will be described in detail.

Figure 1:
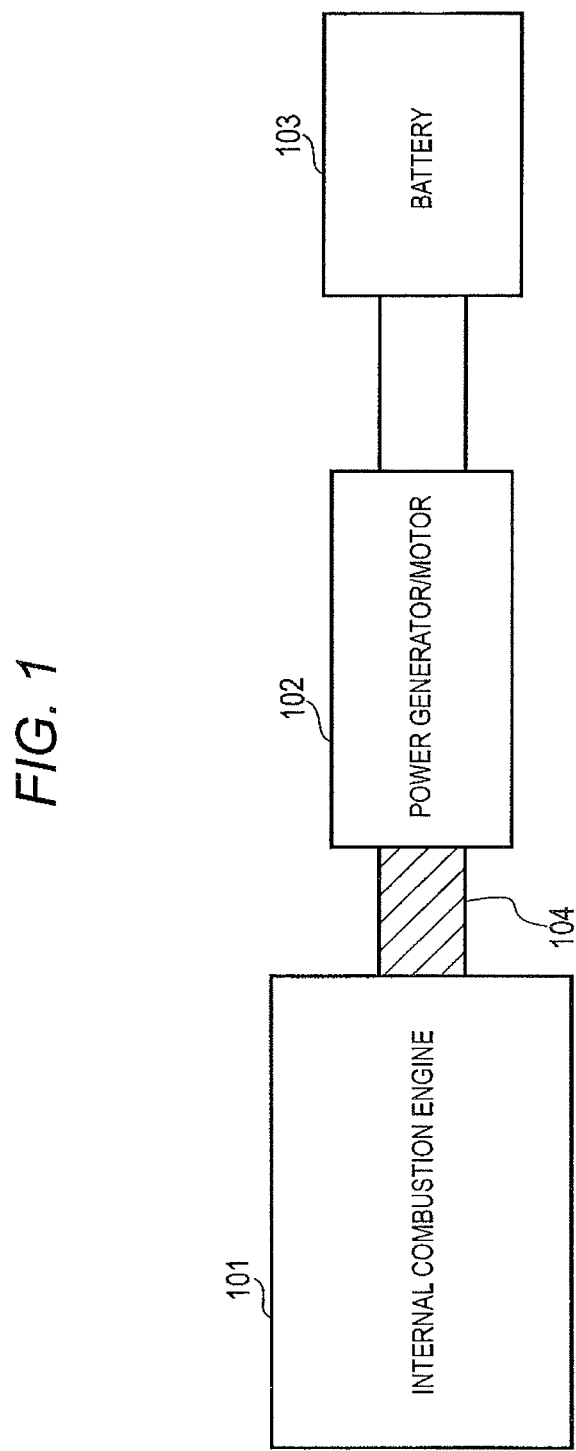
FIG. 1 is a diagram showing the overall construction of a vehicle system using a vehicle power converter according to the present invention.
Figure 2:
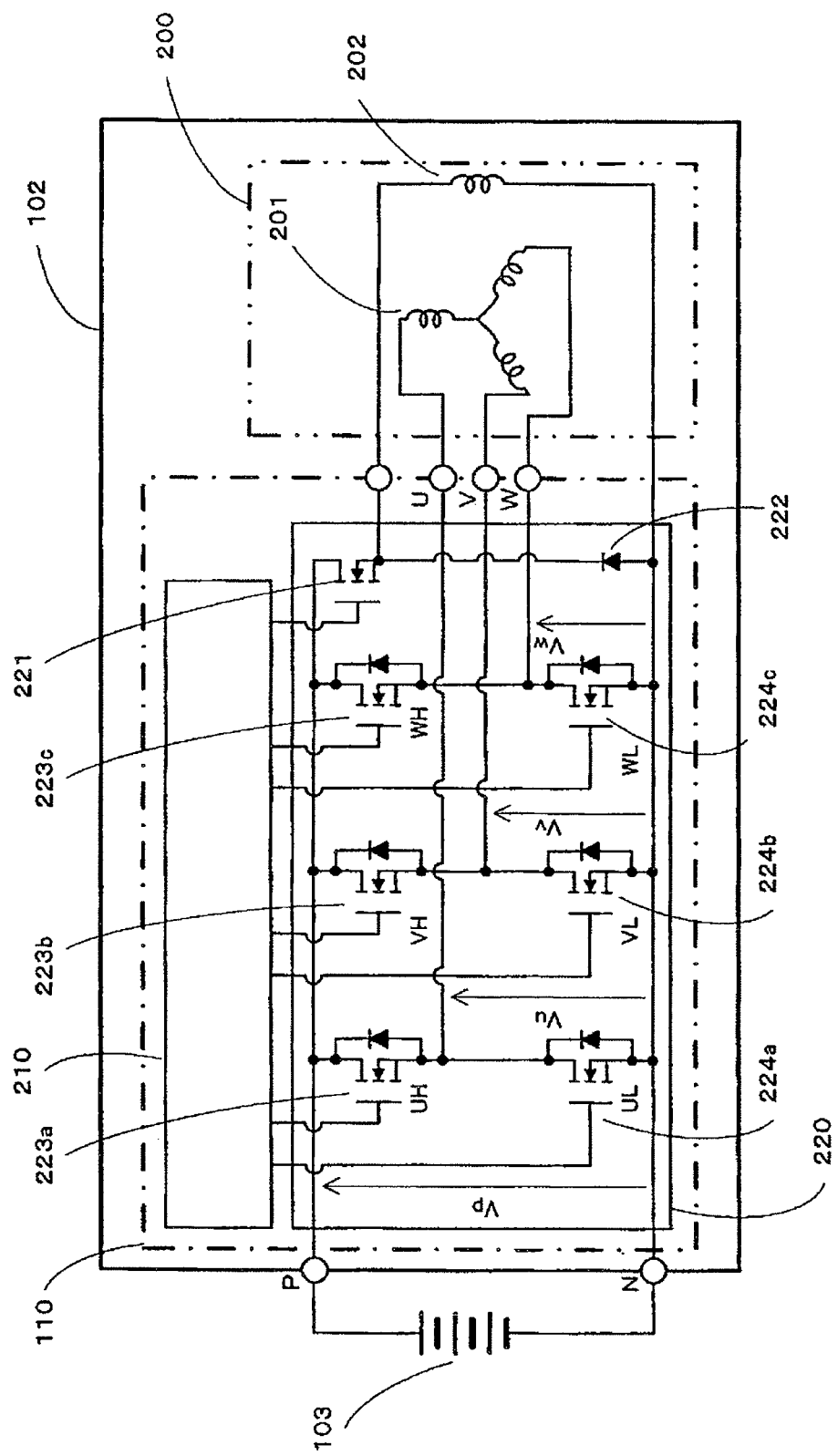
FIG. 2 is a diagram showing the construction of a power generator-motor having the vehicle power converter according to a first embodiment of the present invention.
Figure 3:
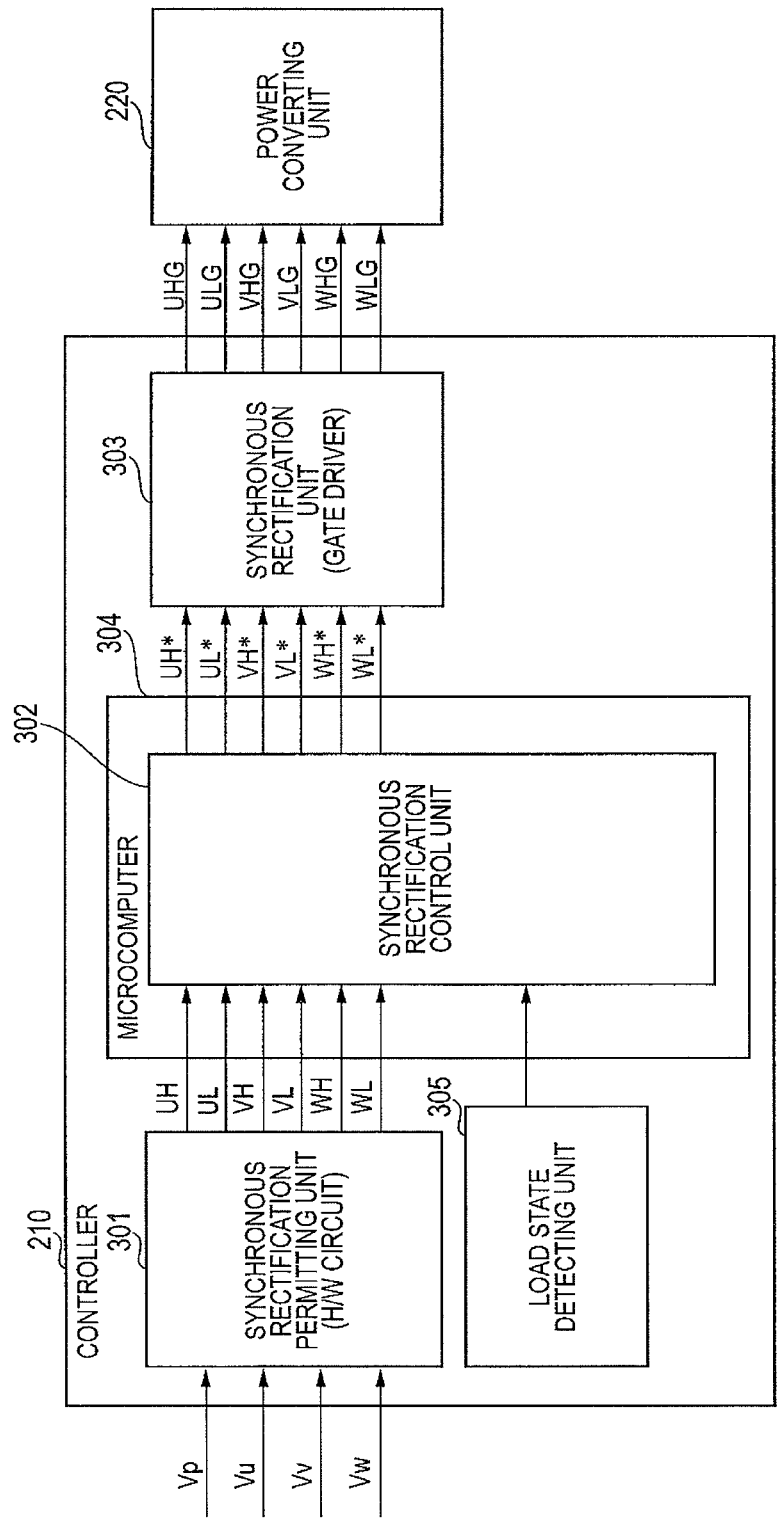
FIG. 3 is a diagram showing the construction of a controller for the vehicle power converter according to the first embodiment of the present invention.

FIG. 1 is a diagram showing a vehicle system using a power generator-motor as a rotating electric machine, FIG. 2 is a diagram showing the construction of the power generator-motor provided with the vehicle power converter according to the first embodiment of the present invention, and FIG. 3 is a block diagram showing the construction of a controller for the power converter according to the first embodiment of the present invention.

In FIG. 1, an internal combustion engine 101 is connected to a power generator-motor 102 through a power transmission unit 104 such as a belt or the like, for example, and electrical energy is charged into a battery 103 through AC-DC conversion of the power generator-motor 102 during operation of the internal combustion engine 101.

In FIG. 2, the power generator-motor 102 comprises a power converting device 110 and a motor generator unit 200, and the power converting device 110 comprises a power converting unit 220 and a control device 210 for performing ON/OFF control of switching elements.

The power converting unit 220 comprises a field switching element 221 for subjecting field current to PWM control, a free wheel diode 222 connected to the switching element 221 in series, three-phase upper arm switching elements 223a to 223c containing parasitic diodes respectively, and three-phase lower arm switching elements 224a to 224c likewise containing parasitic diodes respectively. The three-phase upper arm switching elements 223a to 223c are connected to a P terminal as a plus power supply input from the battery 103, and the three-phase lower arm switching elements 224a to 224c are connected to an N terminal as an earth input from the battery 103 and respective U, V and W phase terminals of a three-phase coil 201 of the motor generator unit 200.

FIG. 2 shows a three-phase field coil type power generator-motor as the motor generator unit 200 having the three-phase coil 201 and the field coil 202, however, the number of phases and the field type (for example, permanent magnet or the like) may be different. Furthermore, an integral construction type power generator-motor 102 in which the power converting device 110 and the motor generator unit 200 are integrated with each other is used. However, a separate construction type power generator-motor 102 in which the power converting device 110 and the power generator-motor 200 are physically separated from each other may be used.

Next, the internal construction of the control device 210 will be described with reference to FIG. 3. The control device 210 comprises a synchronous rectification permitting unit (H/W circuit) 301, a synchronous rectification control device 302, a synchronous rectification unit 303 which is commonly called as a gate driver and a load state detecting unit 305, and the synchronous rectification control device 302 is constructed by a microcomputer 304. The control device 210 and the microcomputer 304 have various functions of the vehicle power converter in addition to the functions shown in FIG. 3, however, only the functions relating to the present invention will be described below.

In the synchronous rectifying permitting unit 301, the potential of the negative side terminal N of the power converting unit 220 is set as a reference, the voltage Vp at the positive side terminal P and the voltages Vu, Vv and Vw at the respective three-phase terminals U, V, W are input, and it is detected from the voltage Vp and the respective three-phase terminal voltages Vu, Vv and Vw whether forward current flows through the parasitic diode under the state that the switching element is not turned on. With respect to this detected output, on-timing angles are output from the upper and lower arms of all the phases while an ON-state in which the forward current flows through the parasitic diode is set to Hi level and an OFF-state in which no forward current flows through the parasitic diode is set to Low level.

A well-known technique may be used to detect the ON/OFF state of the diode of the synchronous rectification permitting unit 301, and for example, the output of the synchronous rectification permitting unit 301 may be generated by using the method disclosed in JP-A-2008-228450. The ON/OFF state of the parasitic diode may be detected by using other well-known techniques, and the same is applicable to the following embodiments. In this case, when ON timing angle is set to Hi level, the ON state is set, and when the ON timing angle is set to Low level, the OFF state is set. However, the setting of these states may be reversed. The ON state may be set when an up-edge input is detected by edge detection while the OFF state is set when a down-edge input is detected by edge detection. At any rate, any input may be adopted insofar as the ON state and the OFF state can be discriminated from each other.

In the synchronous rectification control unit 302, the ON/OFF timings of the upper and lower switching elements of all the phases are calculated on the basis of the ON timing as the output of the synchronous rectification permitting unit 301, and the ON/OFF timings are output to the synchronous rectification unit 303 when the output of the load state rectification detecting unit 305 is set to Hi level (synchronous rectification is permitted). The synchronous rectification unit 303 generates ON/OFF signals for gate instructions of switching elements UH223a, VH223b, WH223c, UL224a, VL224b and WL224c of the vehicle power converter 220 on the basis of the output of the synchronous rectification control unit 302, and inputs these ON/OFF signals to the gates of these switching elements.

Figure 4:
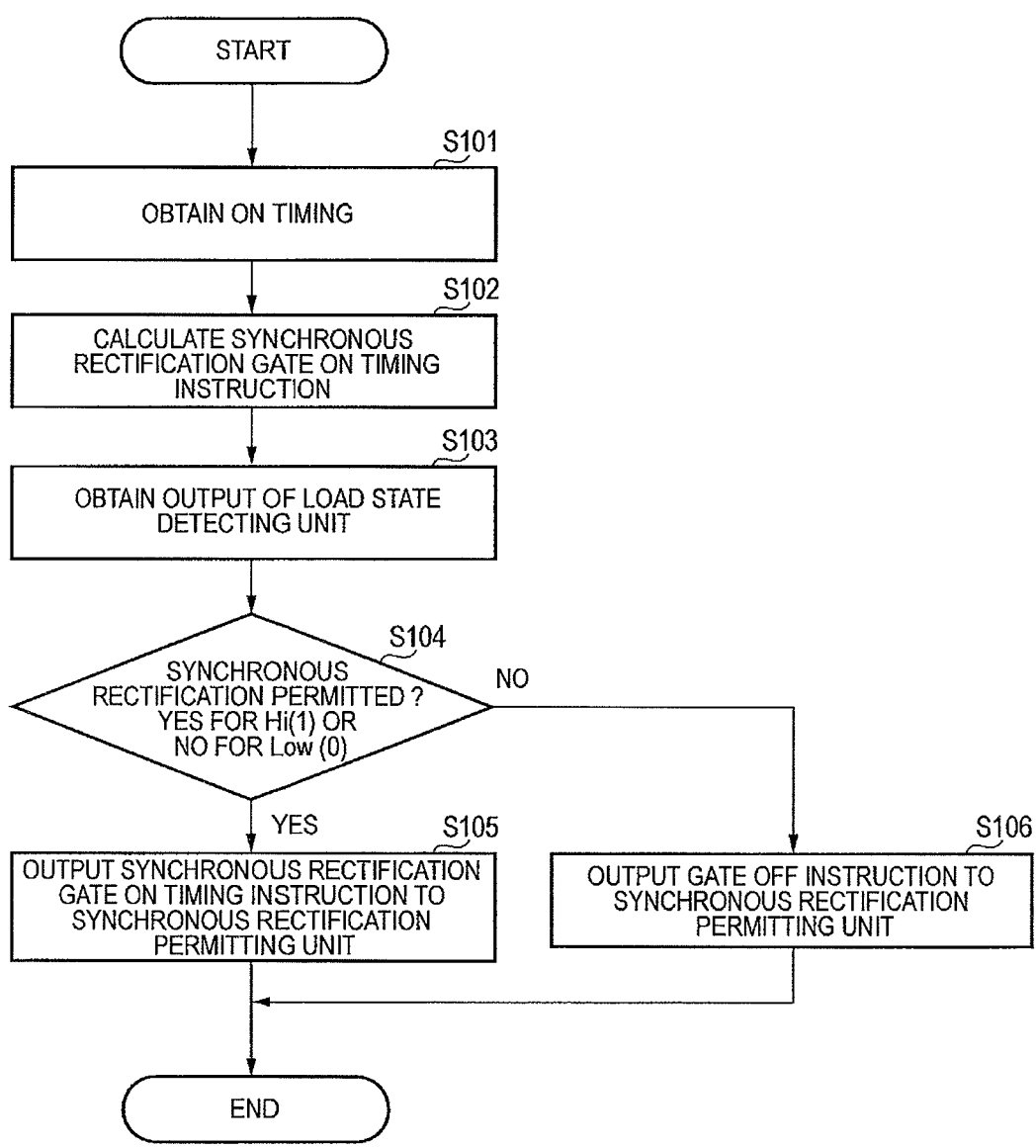
FIG. 4 is a flowchart showing the operation of the controller for the power generator-motor according to the first embodiment of the present invention.

FIG. 4 is a flowchart showing the operation when the synchronous rectification of the control device 210 described with reference to FIG. 3 is executed.

In step S101, the ON timing of the parasitic diode of each switching element of the power converting device 110 is obtained by a microcomputer. In step S102, the synchronous rectification gate ON timing instructions of the upper and lower arm switching elements 223 of all the phases are calculated on the basis of the ON timings of the diodes. In step S103, the output of the load state detecting unit 305 is obtained, and permission of synchronous rectification is determined when the output is set to Hi level while prohibition of the synchronous rectification is determined when the output is set to Low level. In step S104, when the permission of the synchronous rectification is determined on the basis of the output of the load state detecting unit 305, the processing goes to step S105. In step S105, the synchronous rectification gate ON timing instruction is output to the synchronous rectification unit 303. When the synchronous rectification prohibition is determined in step S104, the processing goes to step S106 to output a gate OFF instruction to the synchronous rectification unit 303.

Here, the load state detecting unit 305 will be described.

Figure 5:
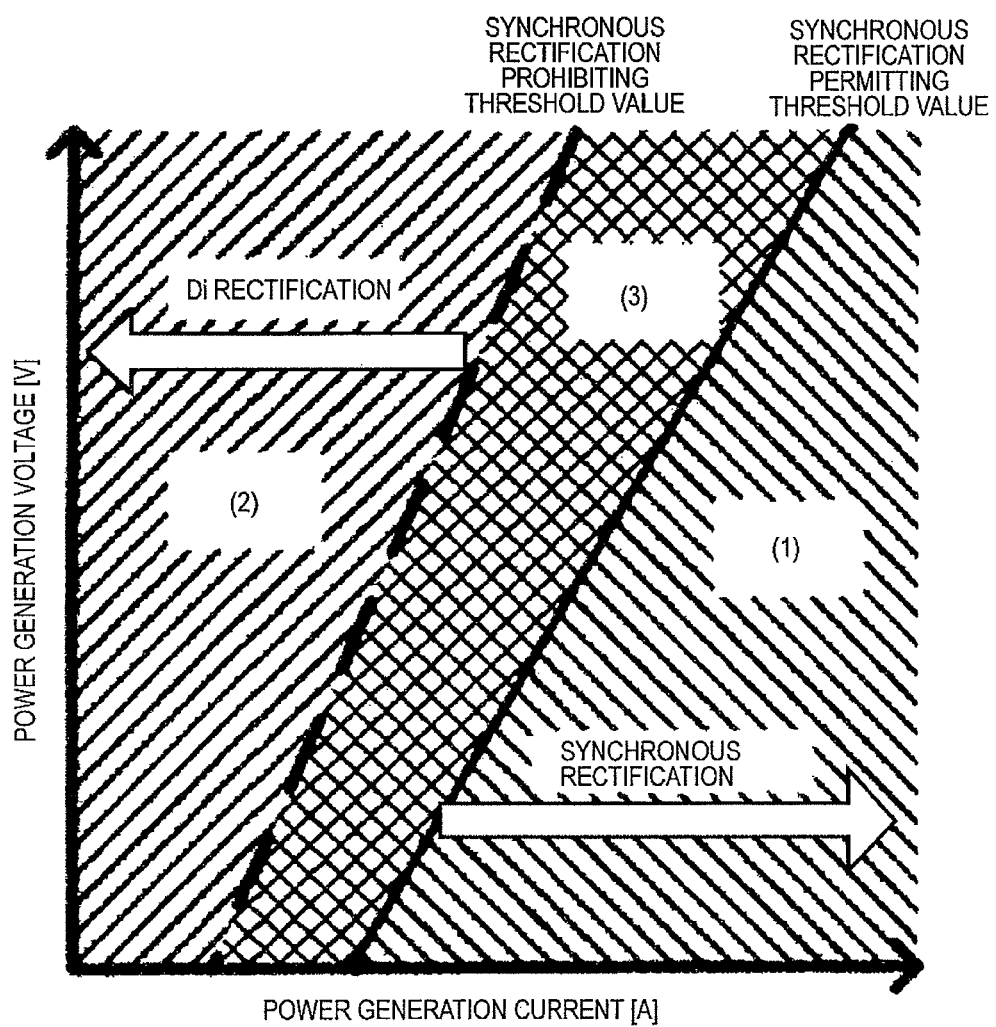
FIG. 5 is a diagram showing the shift between diode rectification and synchronous rectification of the controller for the power generator-motor according to the first embodiment of the present invention.

FIG. 5 is a diagram showing the shift between the diode rectification and the synchronous rectification in accordance with the load state according to the first embodiment. In a case where the load state of the power generator-motor 102 is larger than a synchronous rectification permitting threshold value, the rectification style is changed to the synchronous rectification when the diode rectification is being carried out (for example when the power generation current increases with the voltage being constant, the rectification style is shifted to a portion (1) of FIG. 5). On the other hand, in a case where the load state is smaller than a synchronous rectification prohibiting threshold value, the rectification style is shifted to the diode rectification when the synchronous rectification is being carried out (for example, when the power generation current decreases with the voltage being constant, the rectification style is shifted to a portion (2) of FIG. 5). The portion represented by (3) of FIG. 5 corresponds to a hysteresis portion in which both the diode rectification and the synchronous rectification exist. By providing hysteresis as a shift condition as described above, the synchronous rectification can be continually executed even if the load state decreases when the diode rectification is shifted to the synchronous rectification.

Figure 6:
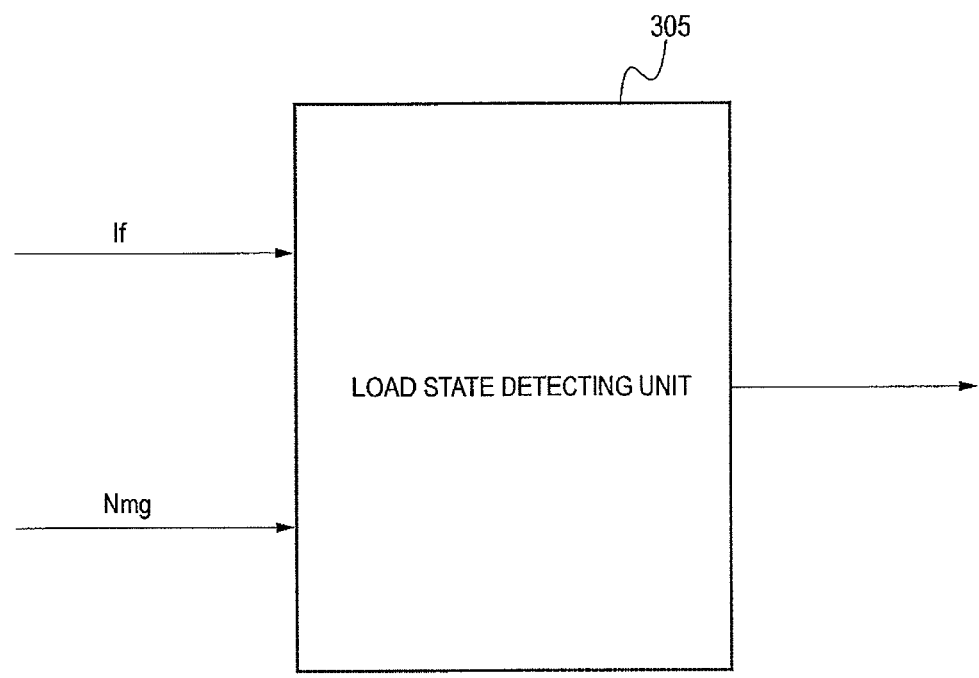
FIG. 6 is a diagram showing the construction of a load state detecting unit in the controller for the power generator-motor according to the first embodiment of the present invention.

FIG. 6 shows the functional construction of the load state detecting unit 305. As described below in detail, the load state detecting unit 305 detects the load state of the power generator-motor on the basis of the field current If and the rotational speed Nmg of the power generator-motor 102 as inputs thereto.

Figure 7:
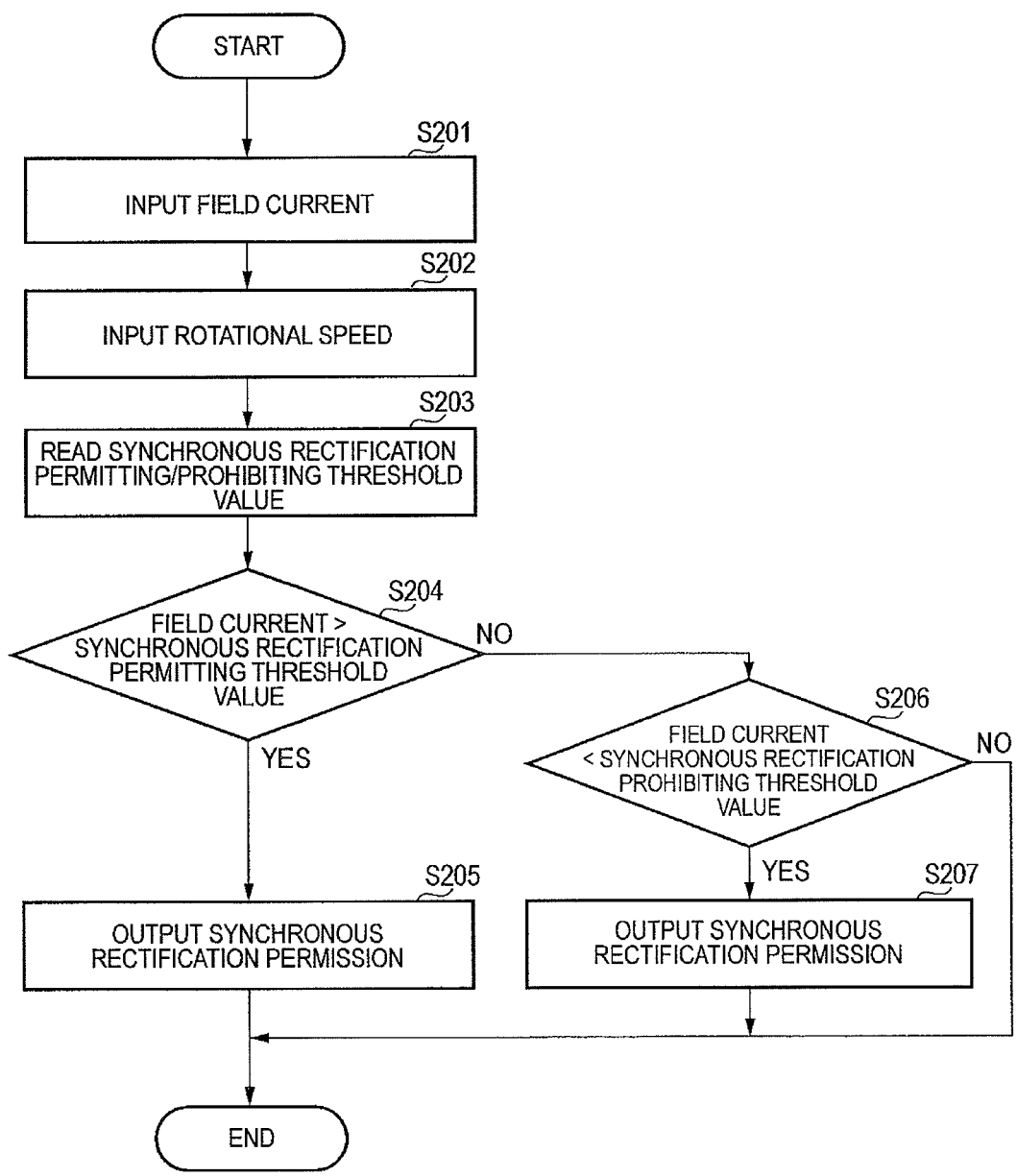
FIG. 7 is a flowchart showing the operation of the load state detecting unit shown in FIG. 6.
Figure 8:
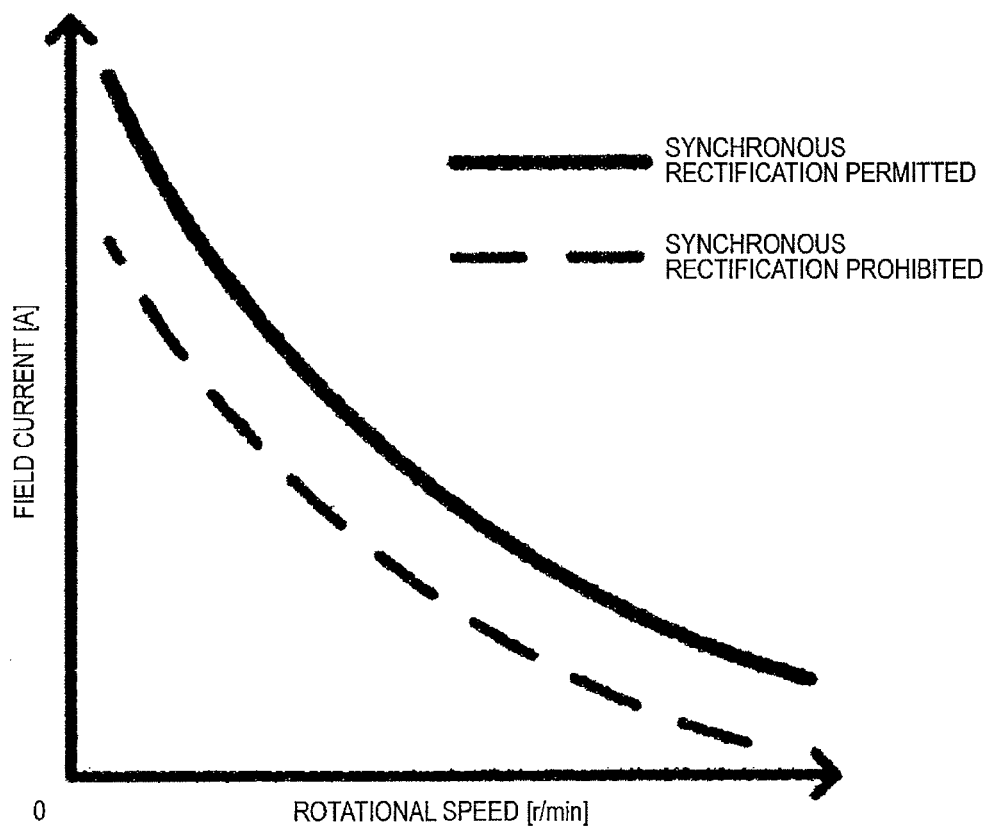
FIG. 8 is a diagram showing a synchronous rectification permitting threshold value and a synchronous rectification prohibiting threshold value according to the first embodiment of the present invention.

FIG. 7 is a flowchart showing the operation of the load state detecting unit 305. In step S201, the field current If of the power generator-motor 102 is input. In step S202, the rotational speed Nmg of the power generator-motor 102 is input. In step S203, on the basis of the rotational speed Nmg of the power generator-motor, a synchronous rectification permitting threshold value and a synchronous rectification prohibiting threshold value which are represented by field current If are read out from a map (FIG. 8) in which values obtained by an experiment or the like in advance are stored. In step S204, the synchronous rectification permitting threshold value read in step S203 is compared with the input field current. When the input field current is larger than the synchronous rectification permitting threshold value in step S204, the processing goes to step S205, and the load state detecting unit 305 outputs Hi level (1) representing synchronous rectification permission. On the other hand, when the input field current is smaller than the synchronous rectification permitting threshold value in step S204, the processing goes to step S206, and the synchronous rectification prohibiting threshold value read in step S203 is compared with the input field current. When the input field current is smaller than the synchronous rectification prohibiting threshold value, the processing goes to step S207, and the load state detecting unit 305 outputs Low level (0) representing synchronous rectification prohibition. On the other hand, when the input field current is larger than the synchronous rectification prohibiting threshold value in step S206, the processing goes to END without executing any step.

As described above, according to the first embodiment, by providing hysteresis to the synchronous rectification permitting threshold value and the synchronous rectification prohibiting threshold value, when the diode rectification is shifted to the synchronous rectification, the loss caused by the voltage drop at the diode is eliminated and thus the power generation voltage increases. Accordingly, even when the field current decreases by the voltage control for keeping the power generation voltage constant, the field current is avoided from being equal to or smaller than the synchronous rectification prohibiting threshold value, and thus the synchronous rectification can be continually executed.

Second Embodiment

A second embodiment according to the present invention will be described with reference to the drawings.

Figure 9:
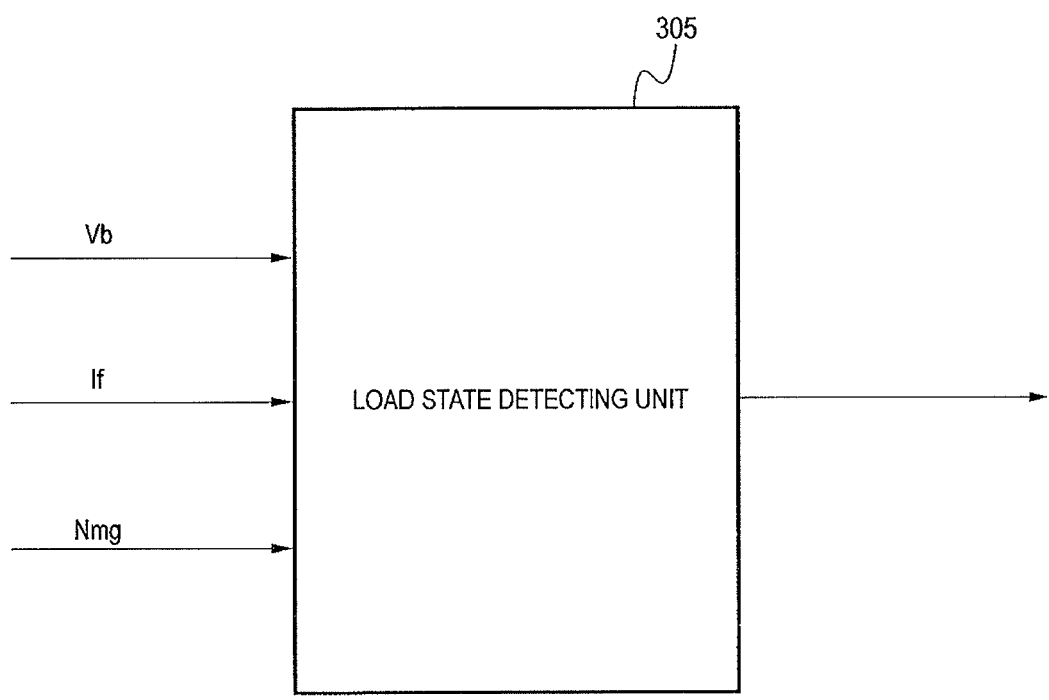
FIG. 9 is a diagram showing the construction of a load state detecting unit in a controller for a power generator-motor according to a second embodiment of the present invention.

FIG. 9 shows the construction of the load state detecting unit 305 for implementing the controller for the power generator-motor according to the second embodiment. The difference of this embodiment from the first embodiment resides in that a power generation voltage Vb of the power generator-motor 102 is input to the load state detecting unit 305.

In the first embodiment, the synchronous rectification permitting threshold value and the synchronous rectification prohibiting threshold value are dependent on the rotational speed, but the power generation voltage is not set as a parameter. Actually, when the power generation voltage is low, the power generation current for the shift from the diode rectification to the synchronous rectification can be reduced. However, when the power generation voltage increases, the power generation current for the shift from the diode rectification to the synchronous rectification also increases. Therefore, if the synchronous rectification permitting threshold value and the synchronous rectification prohibiting threshold value when the power generation voltage is low are adopted, it means that the synchronous rectification is executed under the state that sufficient power generation is not executed when the power generation voltage is high, and thus the synchronous rectification fails.

Therefore, the synchronous rectification permitting threshold value and the synchronous rectification prohibiting threshold value when the power generation voltage is high must be used. Accordingly, when the power generation voltage is low, the diode rectification cannot be shifted to the synchronous rectification even in an area where the synchronous rectification can be performed. Therefore, according to the second embodiment, the output of the load state detecting unit is changed in accordance with the power generation voltage to enlarge the operation area in which the synchronous rectification can be performed, and the power generation current for the shift from the diode rectification to the synchronous rectification is set to be constant.

Figure 10:
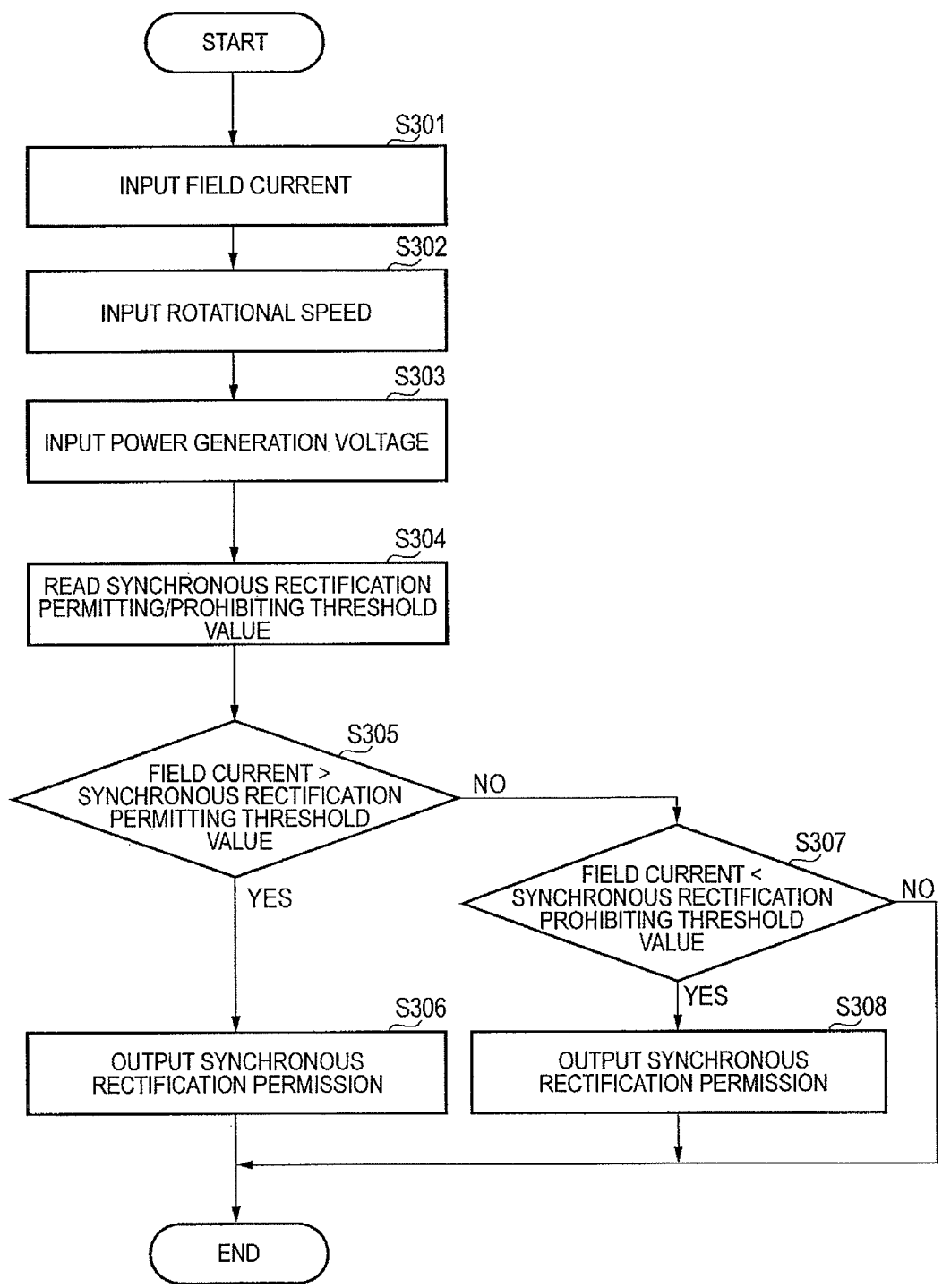
FIG. 10 is a flowchart showing the operation of the load state detecting unit shown in FIG. 9.
Figure 11:
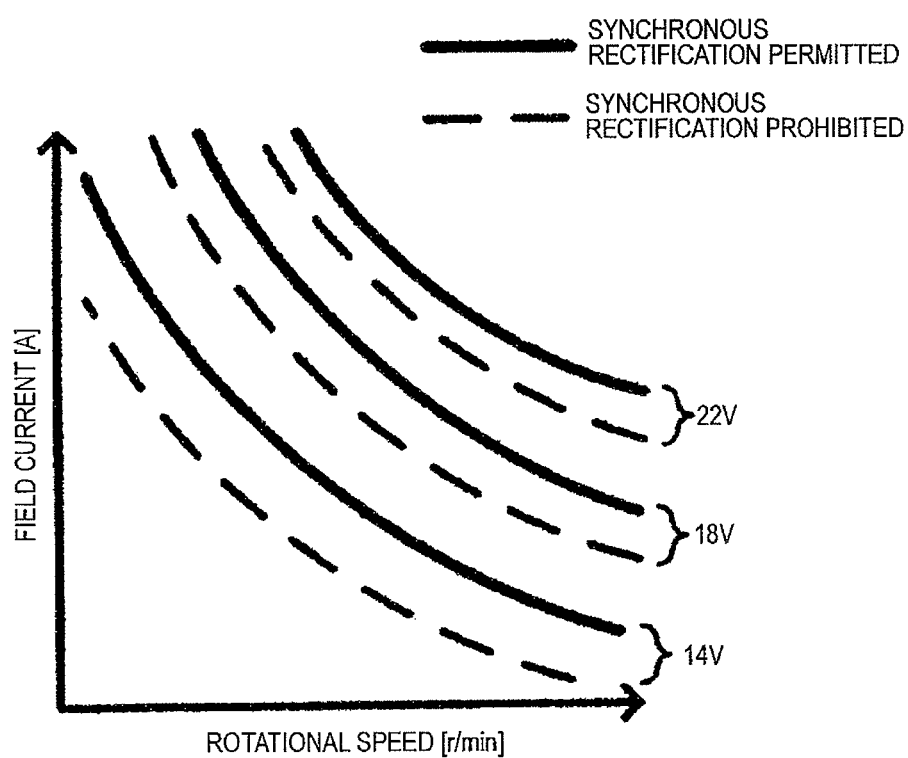
FIG. 11 is a diagram showing a synchronous rectification permitting threshold value and a synchronous rectification prohibiting threshold value according to the second embodiment of the present invention.

FIG. 10 is a flowchart showing the operation of the load state detecting unit 305 according to the second embodiment. In FIG. 10, in step S301, the field current If of the power generator-motor is input. In step S302, the rotational speed Nmg of the power generator-motor is input. In step S303, the power generation voltage Vb of the power generator-motor is input. In step S304, on the basis of the rotational speed and the power generation voltage of the power generator-motor, a synchronous rectification permitting threshold value and a synchronous rectification prohibiting threshold value which are represented by field current are read out from a map (FIG. 11) in which values obtained by an experiment or the like are stored in advance.

In step S305, the synchronous rectification permitting threshold value read in step S304 is compared with the input field current. When the input field current is larger than the synchronous rectification permitting threshold value, the processing goes to step S306, and the load state detecting unit 305 outputs Hi level (1) representing synchronous rectification permission. When the input field current is smaller than the synchronous rectification permitting threshold value in step S305, the processing goes to step S307 to compare the synchronous rectification prohibiting threshold value read in step S304 with the input field current. When the input field current is smaller than the synchronous rectification prohibiting threshold value, the processing goes to step S308, and the load state detecting unit 305 outputs Low level (0) representing the synchronous rectification prohibition. When the input field current is larger than the synchronous rectification prohibiting threshold value in step S307, the processing goes to END without executing any step.

Figure 12:
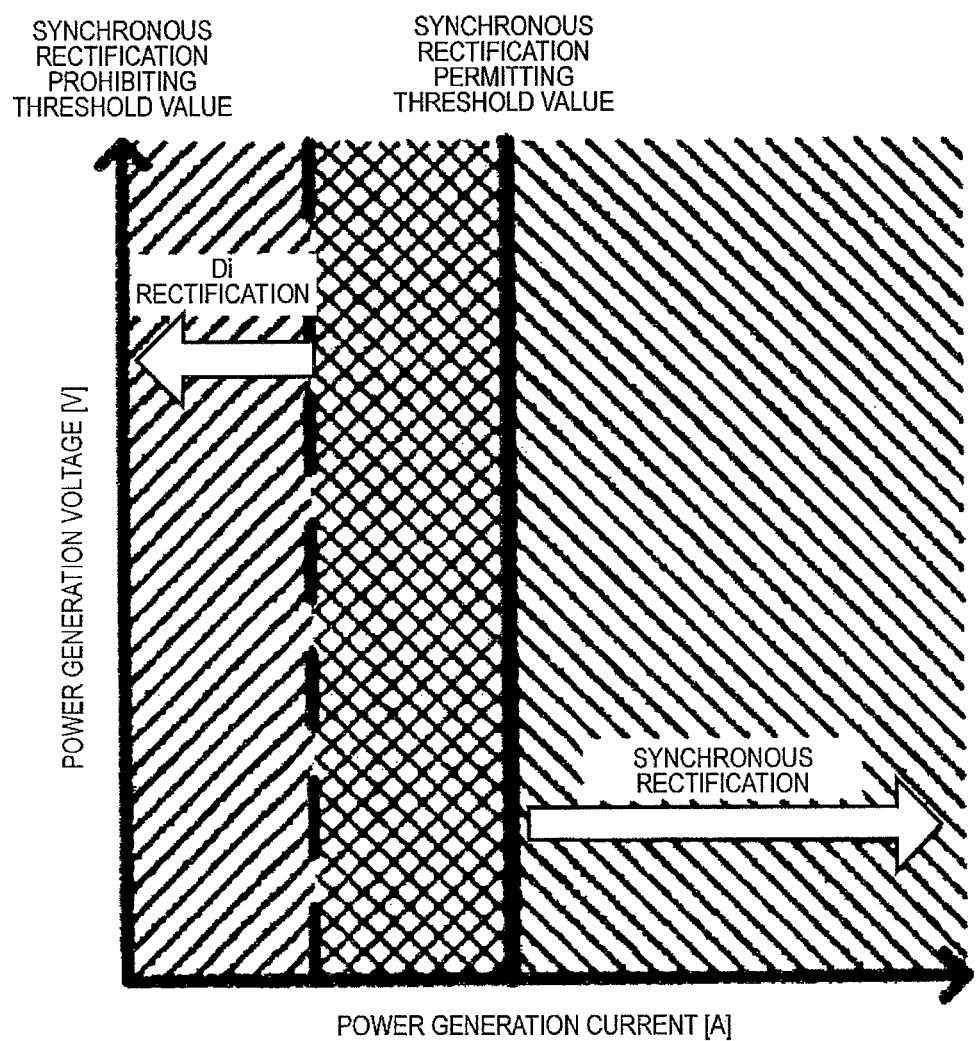
FIG. 12 is a diagram showing an operation state of the power generator-motor according to the second embodiment of the present invention.

In the second embodiment, the power generation voltage is input to the load state detecting unit 305, and it is used as a parameter for the synchronous rectification permitting threshold value and the synchronous rectification prohibiting threshold value. Accordingly, it is possible to shift the diode rectification to the synchronous rectification with constant power generation current even when the power generation voltage is different as shown in FIG. 12, and the operation range of the synchronous rectification having a high power generation efficiency can be enlarged.

Third Embodiment

A third embodiment according to the present invention will be described with reference to the drawings.

Figure 13:
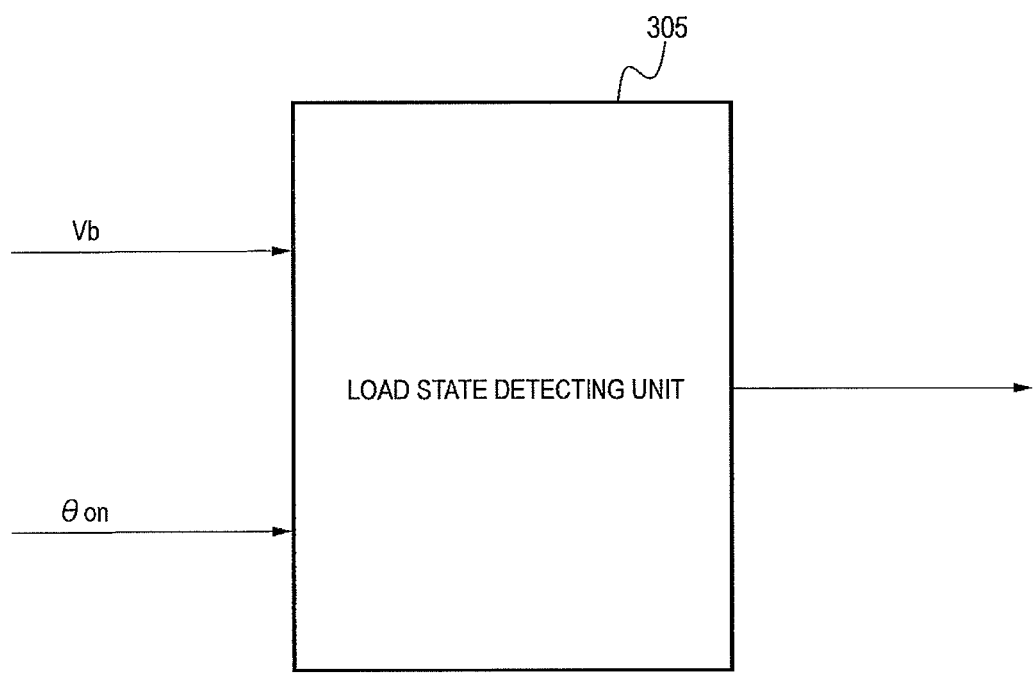
FIG. 13 is a diagram showing the construction of a load state detecting unit in a controller for a power generator-motor according to a third embodiment of the present invention.

FIG. 13 shows the construction of the load state detecting unit for implementing the controller of the power generator-motor according to the third embodiment. The difference of this embodiment from the first and second embodiments resides in that an ON timing angle θon of the diode and a power generation voltage Vb are input to the load state detecting unit 305. The ON timing angle is obtained by detecting a rotational position (angle) from a rotational position sensor (resolver or encoder) indicating the rotational position of the power generator-motor or the like. Here, the ON timing angle of the diode means an energization (current passing) angle (not more than 180 deg) at which the diode is set to ON.

In the first embodiment, the rotational speed and the field current are input to the load state detecting unit 305, and in the second embodiment the power generation voltage, the rotational speed and the field current are input to the load state detecting unit 305. However, in the third embodiment, the ON timing angle of the parasitic diode is input to the load state detecting unit 305. Here, the ON timing angle of the parasitic diode may be determined from the voltage Vp at the positive side terminal and each of the terminal voltages Vu, Vv and Vw of the three-phases (U, V, W) with the potential of the negative side terminal N of the power converting unit 220 set as a reference by using the technique disclosed in JP-A-2008-228450. The ON timing angle may be obtained by using other well-known techniques. Here, the ON timing angle is detected on the basis of the induced voltages Vu, Vv, Vw and the voltage Vp, and the induced voltage is dependent on the field current flowing through the power generator-motor and the rotational speed as in the case of the second embodiment. The ON timing angle represents the load state of the power generator-motor.

Figure 14:
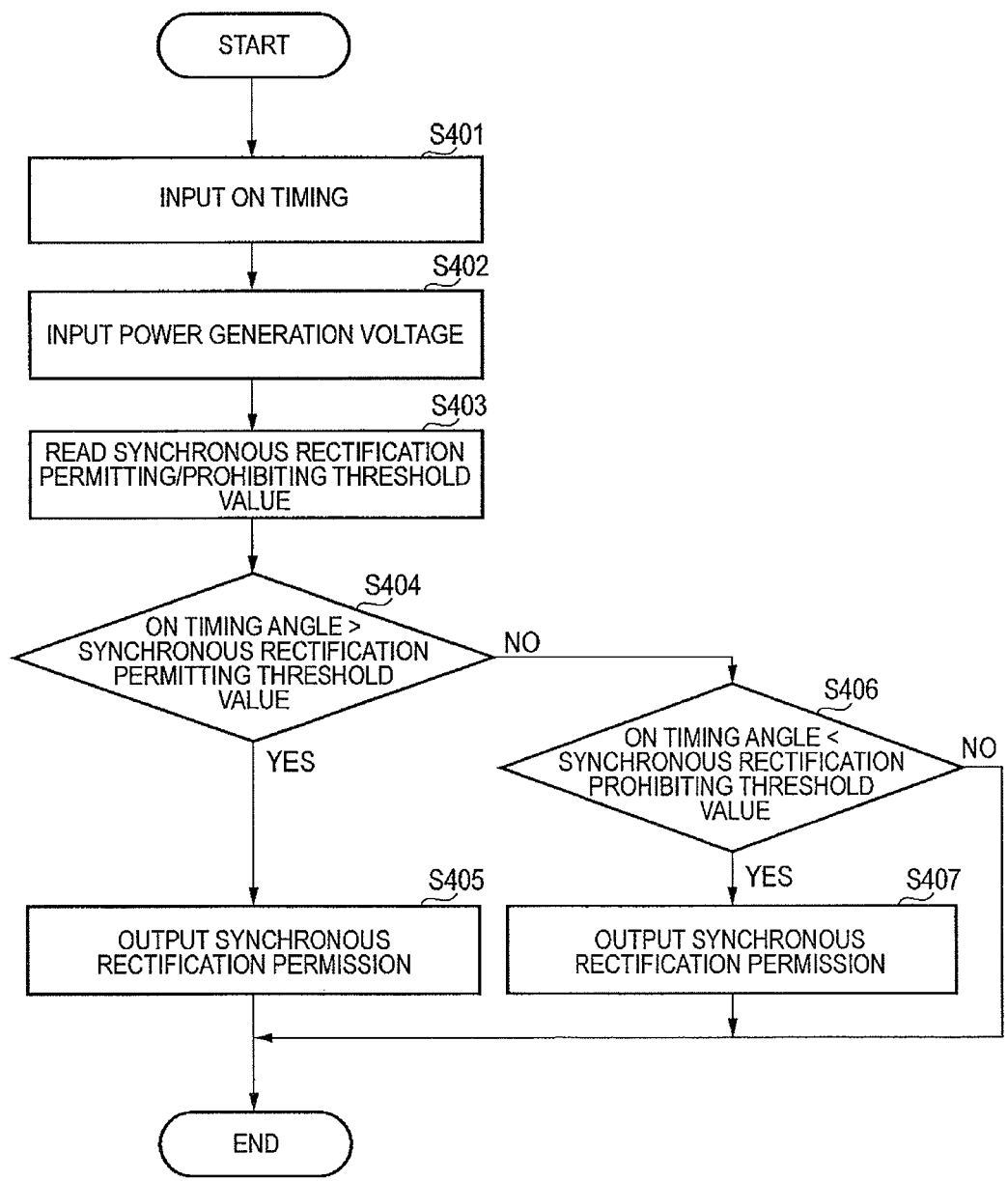
FIG. 14 is a flowchart showing the operation of the load state detecting unit shown in FIG. 13.

FIG. 14 is a flowchart showing the operation of the third embodiment. In step S401, the ON timing angle θon is obtained. Subsequently, in step S402, the power generation voltage Vb is obtained. Subsequently, in step S403, the synchronous rectification permitting threshold value and the synchronous rectification prohibiting threshold value are read out from a map in which values obtained by an experiment or the like is stored in advance. Subsequently, in step S404, the ON timing angle obtained in step S401 is compared with the synchronous rectification permitting threshold value read in step S403. When the ON timing angle is larger than the synchronous rectification permitting threshold value, the processing goes to step S405, and the load state detecting unit 305 outputs Hi level to permit the synchronous rectification. When the ON timing angle is smaller than the synchronous rectification permitting threshold value in step S404, the processing goes to step S406 to compare the ON timing angle with the synchronous rectification prohibiting threshold value. When the ON timing angle is smaller than the synchronous rectification prohibiting threshold value, the processing goes to step S407, and the load state detecting unit outputs Low level to prohibit the synchronous rectification. When the ON timing angle is larger than the synchronous rectification prohibiting threshold value, the processing goes to END without executing any step.

Figure 15:
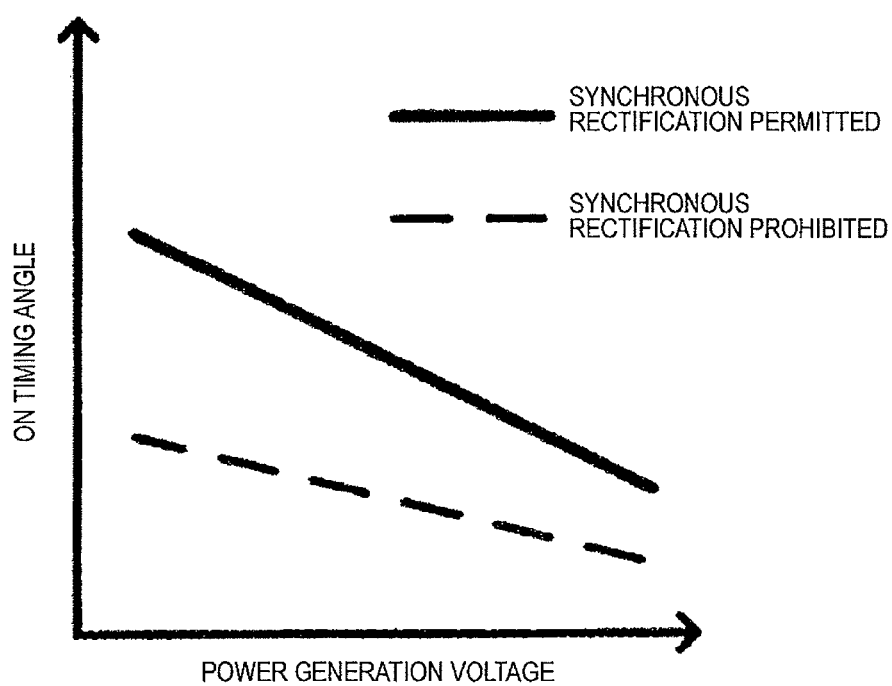
FIG. 15 is a diagram showing a synchronous rectification permitting threshold value and a synchronous rectification prohibiting threshold value according to the third embodiment of the present invention.

FIG. 15 is a diagram in which the synchronous rectification permitting threshold value and the synchronous rectification prohibiting threshold value are represented by using the ON timing angle. An induced voltage which is higher by the amount corresponding to the voltage drop of the diode is required during the diode rectification, and thus a larger amount of field current is made to flow during the diode rectification than that during the synchronous rectification. That is, the fixed voltage is kept, and thus the field current decreases after the shift to the synchronous rectification. Therefore, the induced voltage which has occurred since the diode rectification decreases, and the ON timing angle calculated from the induced voltages Vu, Vv, Vw and the voltage Vp after the shift to the synchronous rectification is smaller than the ON timing angle during the diode rectification. Accordingly, the width of the hysteresis of the synchronous rectification permitting threshold value and the synchronous rectification prohibiting threshold value may be set to be larger than the decrease angle of the ON timing angle, and the synchronous rectification permitting threshold value may be set to be larger than the synchronous rectification prohibiting threshold value.

Figure 16:
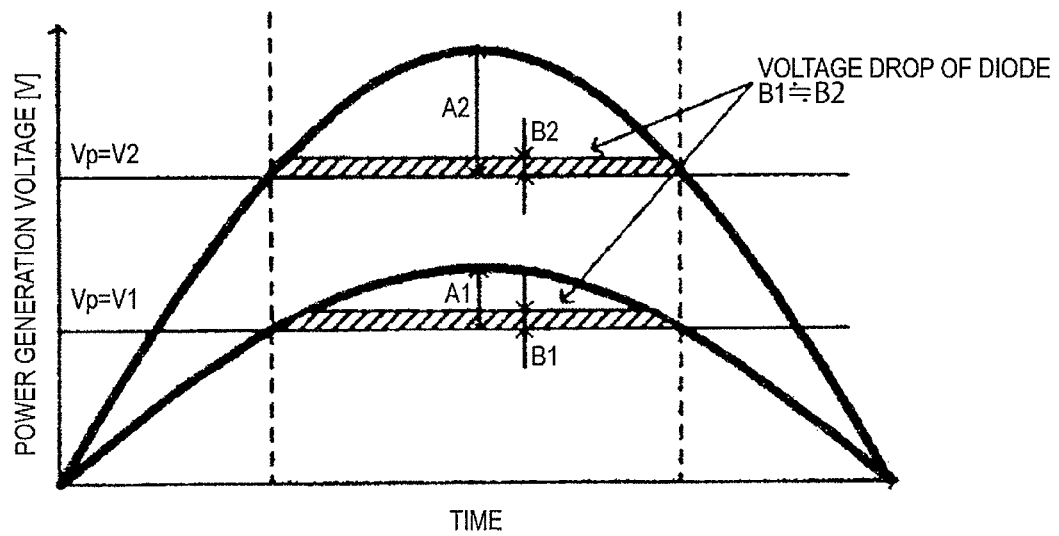
FIG. 16 is a diagram showing an occupation rate of a diode voltage drop of an induced voltage generated in the power generator-motor according to the third embodiment of the present invention.

FIG. 16 is a diagram showing an occupation rate of the diode voltage drop to the induced voltage occurring in the power generator-motor in the above case. Under the load having the same condition as shown in FIG. 16, when the power generation voltage is low (V1), the induced voltage occurring in the power generator-motor is relatively smaller than that when the power generation voltage is high (V2). The rate (=B1/A1) of the voltage drop occurring in the diode under the shift from the diode rectification to the synchronous rectification to the induced voltage when the power generation is low is larger than that when the power generation voltage is high (=B2/A2). Therefore, the decrease of the ON timing angle when the power generation voltage is high is smaller than the decrease of the ON timing angle when the power generation voltage is low. Accordingly, as shown in FIG. 15, when the power generation voltage is low, the hysteresis width may be increased, and when the power generation voltage is high, the hysteresis width may be reduced.

The hysteresis width of the synchronous rectification permitting threshold value and the synchronous rectification prohibiting threshold value is set in accordance with the power generation voltage, whereby the rectification style can be changed from the diode rectification to the synchronous rectification with substantially the same power generation current even when the power generation voltage varies, and thus the operation area of the highly efficient synchronous rectification can be enlarged.

In the third embodiment, the ON timing angle is calculated on the basis of the rotational position (angle). However, the time of the ON timing angle may be measured by the timer function of a microcomputer with an input of the timing angle as a trigger, and the conversion to the ON timing angle may be executed on the basis of the ON timing time and the rotational speed.

Fourth Embodiment

A fourth embodiment according to the present invention will be described with reference to the drawings.

Figure 17:
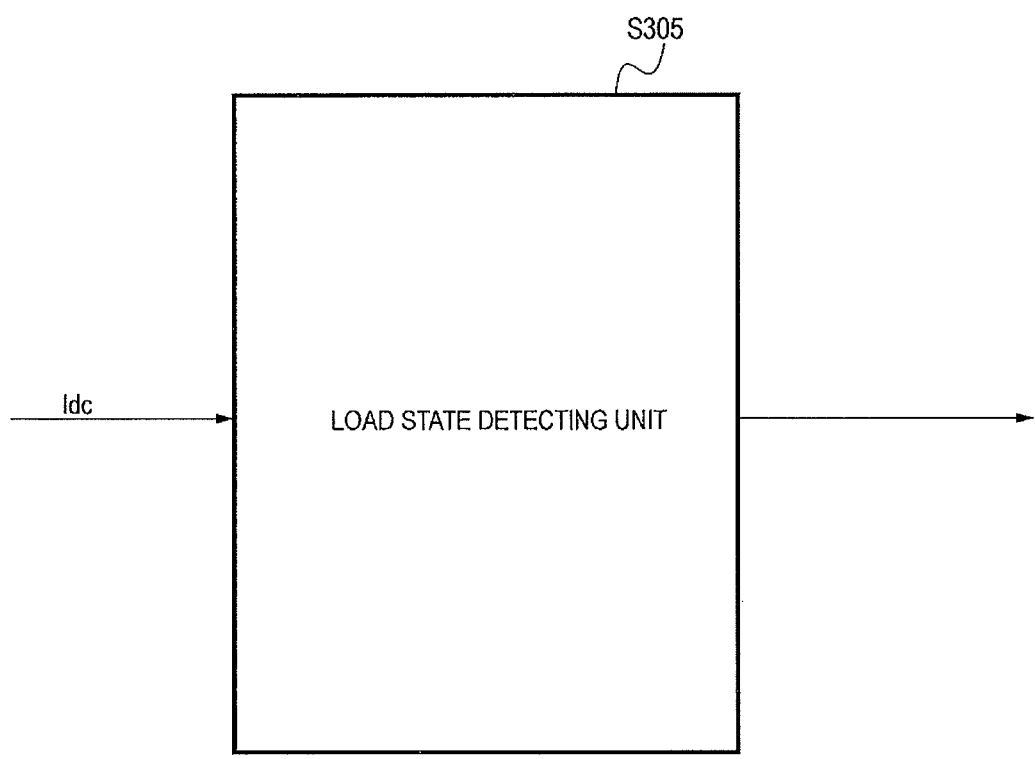
FIG. 17 is a diagram showing the construction of a load state detecting unit in a controller for a power generator-motor according to a fourth embodiment of the present invention.

FIG. 17 shows the construction of the load state detecting unit for implementing the control device for the power generator-motor according to a fourth embodiment. The difference of this embodiment from the first and second embodiments resides in that the load state detecting unit 305 inputs only the power generation current Idc.

Figure 18:
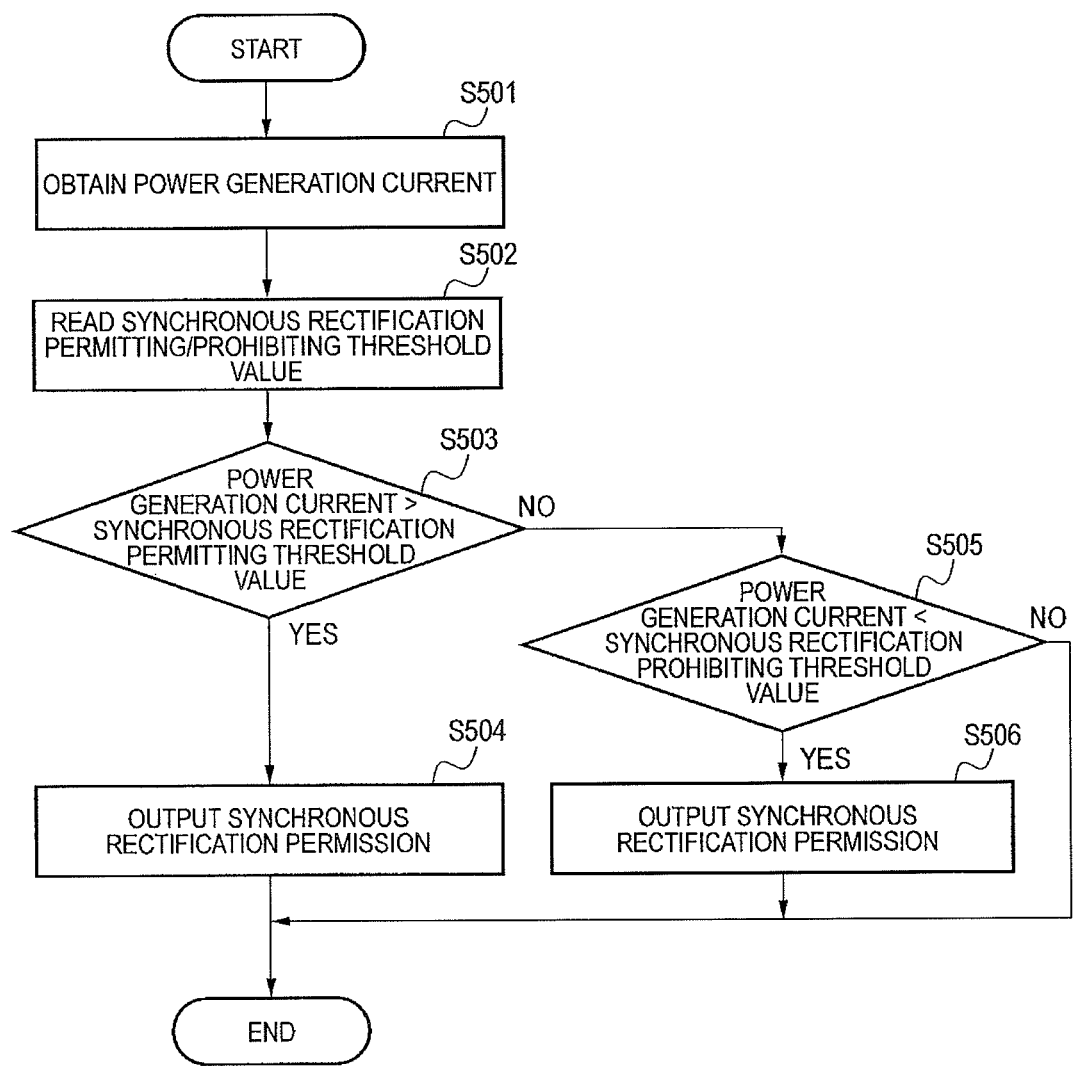
FIG. 18 is a flowchart showing the operation of the load state detecting unit shown in FIG. 17.

FIG. 18 is a flowchart showing the operation of the fourth embodiment. In step S501, the power generation current of the power generator-motor is obtained. Subsequently, in step S502, the synchronous rectification permitting threshold value and the synchronous rectification prohibiting threshold value are read out from a map in which values obtained by an experiment or the like are stored in advance. Subsequently, in step S503, the power generation current obtained in step S501 is compared with the synchronous rectification permitting threshold value read in step S502. When the power generation current value is larger than the synchronous rectification permitting threshold value, the processing goes to step S504, and the load state detecting unit 305 outputs Hi level to permit the synchronous rectification. When the power generation current is smaller than the synchronous rectification permitting threshold value in step S503, the processing goes to step S505 to compare the power generation current with the synchronous rectification prohibiting threshold value. When the power generation current is smaller than the synchronous rectification prohibiting threshold value, the processing goes to step S506, and the load state detecting unit outputs Low level to prohibit the synchronous rectification. When the ON timing angle is larger than the synchronous rectification prohibiting threshold value, the processing goes to END without executing any step.

As described above, according to the fourth embodiment, the power generation current of the power generator-motor is measured, and it is compared with the synchronous rectification permitting threshold value and the synchronous rectification prohibiting threshold value, whereby the rectification style can be shifted from the diode rectification to the synchronous rectification with the same load current irrespective of the power generation voltage, and the operation area of the highly efficient synchronous rectification can be enlarged.

Various modifications and alterations of this invention will be apparent to those skilled in the art without departing from the scope and spirit of this invention, and it should be understood that this is not limited to the illustrative embodiments set forth herein.

What is claimed is:

1. A vehicle power converter connected between a power generator-motor which generates multi-phase AC power and a battery, the vehicle power converter comprising:
    a plurality of switching elements having diodes connected thereto in parallel and constituting a multi-phase bridge circuit;
    a controller for conducting the switching element corresponding to each diode in synchronization with a conduction state of the diode concerned to perform synchronous rectification; and
    a load state detecting unit for detecting a load state of the power generator-motor in response to generation of the multi-phase AC power, wherein a shift from diode rectification to synchronous rectification or a shift from the synchronous rectification to the diode rectification is carried out by the controller in accordance with an output of the load state detecting unit,
    wherein a synchronous rectification permitting threshold value and a synchronous rectification prohibiting threshold value which correspond to load states of the power generator-motor are set so as to be spaced from each other at a predetermined interval, and a predetermined hysteresis width is provided to the shift from the diode rectification to the synchronous rectification or the shift from the synchronous rectification to the diode rectification,
    wherein the load state detecting unit determines the synchronous rectification permitting threshold value and the synchronous rectification prohibiting threshold value by using a rotational speed, field current, and a power generation voltage of the power generator-motor as parameters, and
    wherein the output of the load state detecting unit is changed in accordance with the power generation voltage and thereby the controller shifts the diode rectification to the synchronous rectification with a constant power generation current while the power generation voltage varies.

2. The vehicle power converter according to claim 1, wherein the synchronous rectification permitting threshold value and the synchronous rectification prohibiting threshold value utilize values, stored in a map, which are experimentally obtained in advance based on parameters associated with the synchronous rectification permitting threshold and the synchronous rectification prohibiting threshold.

3. The vehicle power converter according to claim 2, wherein the load state detecting unit compares one of the synchronous rectification permitting threshold value and the synchronous rectification prohibiting threshold value read from the map with one of the parameters to generate a permission signal or prohibit generation of the permission signal.

* * * * *